US009798150B2

(12) United States Patent
Kassouf et al.

(10) Patent No.: US 9,798,150 B2
(45) Date of Patent: Oct. 24, 2017

(54) SYSTEM FOR DISTRIBUTING AUTO-STEREOSCOPIC IMAGES

(71) Applicants: Sidney Kassouf, Burbank, CA (US); John M. Tamkin, Pasadena, CA (US)

(72) Inventors: Sidney Kassouf, Burbank, CA (US); John M. Tamkin, Pasadena, CA (US)

(73) Assignee: Broadcast 3DTV, Inc., Burbank, CA (US)

( * ) Notice: Subject to any disclaimer, the term of this patent is extended or adjusted under 35 U.S.C. 154(b) by 247 days.

(21) Appl. No.: 14/051,407

(22) Filed: Oct. 10, 2013

(65) Prior Publication Data

US 2014/0253695 A1  Sep. 11, 2014

Related U.S. Application Data

(60) Provisional application No. 61/712,208, filed on Oct. 10, 2012.

(51) Int. Cl.
*G02B 27/22* (2006.01)
*H04N 13/04* (2006.01)
(Continued)

(52) U.S. Cl.
CPC ......... *G02B 27/2214* (2013.01); *H04N 1/405* (2013.01); *H04N 13/0409* (2013.01);
(Continued)

(58) Field of Classification Search
CPC .................................................. G02B 27/2214
See application file for complete search history.

(56) References Cited

U.S. PATENT DOCUMENTS 4,583,117 A   4/1986 Lipton
5,113,213 A * 5/1992 Sandor ............... G02B 27/2214
                                                              348/E13.022
(Continued)

FOREIGN PATENT DOCUMENTS

EP        0 847 208 A2    6/1998
GB        2389728 A       12/2003
WO    WO 2010/102290 A2   9/2010

OTHER PUBLICATIONS

Sath V. Perungavoor, "Notification of Transmittal of International Preliminary Report on Patentability", mailed Dec. 19, 2014 (PCT/US13/64410).

(Continued)

*Primary Examiner* — James Pontius
(74) *Attorney, Agent, or Firm* — Birdwell & Janke, LLP

(57) ABSTRACT

A system for distributing auto-stereoscopic images, a parallax blocking mask and methods for producing a parallax blocking mask. A parallax blocking mask is provided as an "add-on" for an existing image display device having a flat panel type display screen. The mask is tailored to the needs of the existing device and delivered to a remote user of the display device. The user mounts the mask to the display device so that the mask overlies the display screen. 3D content in the form of composite stereoscopic images derived from one or more stereoscopic image pairs, and application software, are downloaded to the display device over the Internet, and the application software interleaves the composite stereoscopic images for display on the display screen while the mask is in place. Use of a parallax blocking mask having variable edge transitions, a duty cycle less than fifty percent, or both, is disclosed.

45 Claims, 9 Drawing Sheets

(51) Int. Cl.

| | | |
|---|---|---|
| *H04N 1/405* | (2006.01) | |
| *H04N 21/2365* | (2011.01) | |
| *H04N 21/258* | (2011.01) | |
| *H04N 21/434* | (2011.01) | |
| *H04N 21/441* | (2011.01) | |
| *H04N 21/61* | (2011.01) | |
| *H04N 21/81* | (2011.01) | |

(52) U.S. Cl.
CPC ... *H04N 21/2365* (2013.01); *H04N 21/25875* (2013.01); *H04N 21/4347* (2013.01); *H04N 21/441* (2013.01); *H04N 21/6125* (2013.01); *H04N 21/816* (2013.01); *H04N 21/8146* (2013.01); *Y10T 29/49* (2015.01)

(56) References Cited

U.S. PATENT DOCUMENTS

| | | | |
|---|---|---|---|
| 5,266,995 A | | 11/1993 | Quadracci et al. |
| 5,847,808 A | * | 12/1998 | Goggins .............. H04N 1/23 355/22 |
| 6,396,616 B1 | | 5/2002 | Fitzer et al. |
| 6,473,141 B2 | | 10/2002 | Mosely et al. |
| 6,859,256 B2 | * | 2/2005 | Montgomery ..... G02B 27/2214 348/E13.03 |
| 8,587,638 B2 | | 11/2013 | Pockett |
| 2001/0001566 A1 | | 5/2001 | Moseley et al. |
| 2002/0030675 A1 | | 3/2002 | Kawai |
| 2002/0126389 A1 | | 9/2002 | Moseley et al. |
| 2003/0234980 A1 | | 12/2003 | Montgomery et al. |
| 2010/0321379 A1 | | 12/2010 | Kang et al. |
| 2011/0157339 A1 | * | 6/2011 | Bennett .................. G06F 3/14 348/59 |
| 2011/0187832 A1 | * | 8/2011 | Yoshida .............. A63F 13/02 3/2 |
| 2012/0062565 A1 | | 3/2012 | Fuchs et al. |
| 2012/0169850 A1 | * | 7/2012 | Kim .................. H04N 5/2252 348/47 |
| 2012/0229604 A1 | | 9/2012 | Boyce et al. |

OTHER PUBLICATIONS

European Patent Office, Extended Search Report in European patent application No. 13880709.4 - 1903 / 2907083, Jun. 24, 2016.
Gu Ye et al., A Practical Multi-viewer Tabletop Autostereoscopic Display, IEEE International Symposium on Mixed and Augmented Reality, 2010 Science and Technology Proceedings.
Andrew Nashel et al., Random Hole Display: A Non-Uniform Barrier Autostereoscopic Display, IEEE 3DTV-CON 2009.
Sam H. Kaplan., Theory of Parallax Barriers, J SMPTE 1952, 59:11-21.
Saudi Patent Office, Substantial Examination Report in Saudi Arabia patent application No. 515360269, Date: Dec. 7, 1437 H (approx. May, 2016).
Agip Ksa, email reporting 2nd Examination Report in Saudi Arabia patent application No. 515360269, Apr. 27, 2017, and attachment.
Fei Wu, High optical-efficiency integral imaging display with a gradient-aperture parallax barrier, Chinese Optics Letters, 1671-7694/2013/071101(3), 2013.
Daniel J. Sandin et al., Computer-generated barrier-strip autostereography, Proceedings of SPIE vol. 1083, Three-Dimensional Visualization and Display Technologies (1989).
Qiong-Hua Wang et al., Stereo Viewing Zone in Autostereoscopic Display Based on Parallax Barrier, Int'l Journal for Light and Electronic Optics, vol. 121, Issue 22, Nov. 2010.
N.A. Dodgson, Analysis of the viewing zone of the Cambridge autostereoscopic display, Applied Opice, vol. 35, No. 10, Apr. 1, 1996.
Daniel J. Sand in et al., The Varrier (TM) Auto-Stereographic Display, Proceedings of SPIE vol. 4297 (2001).
Clarke, Modet & Co., letter reporting first Office action in Mexican patent application No. MX/a/2015/004575, dated May 9, 2017.

* cited by examiner

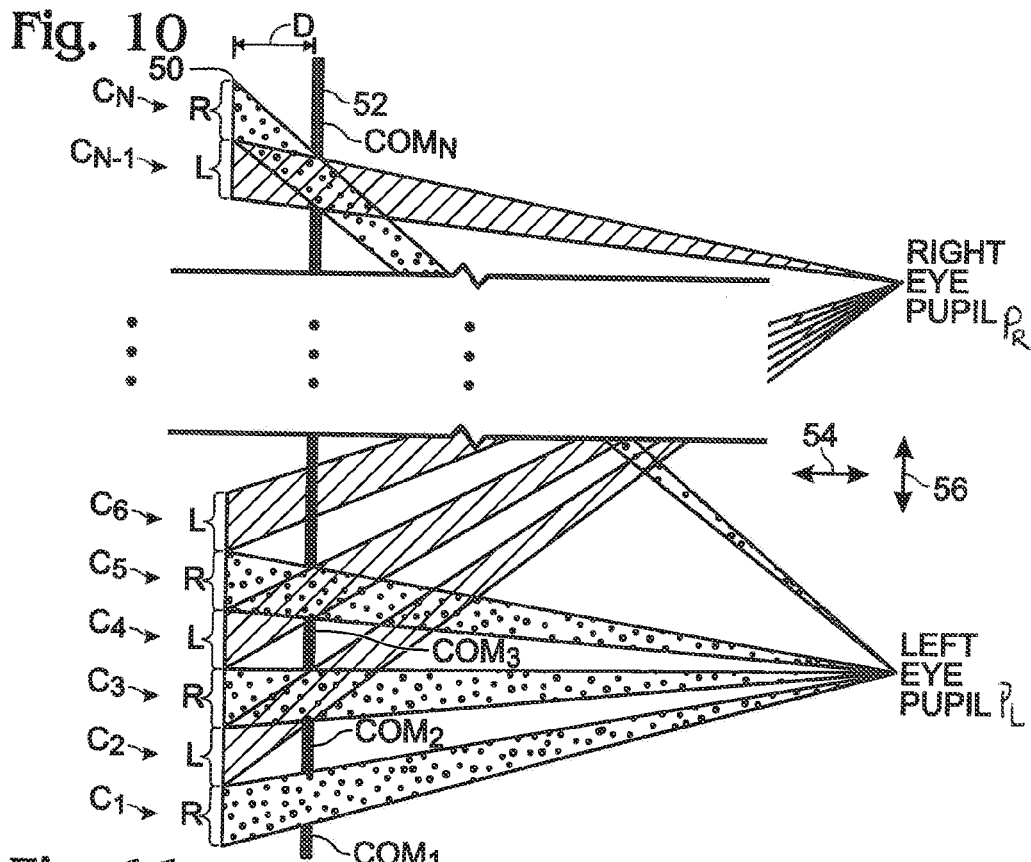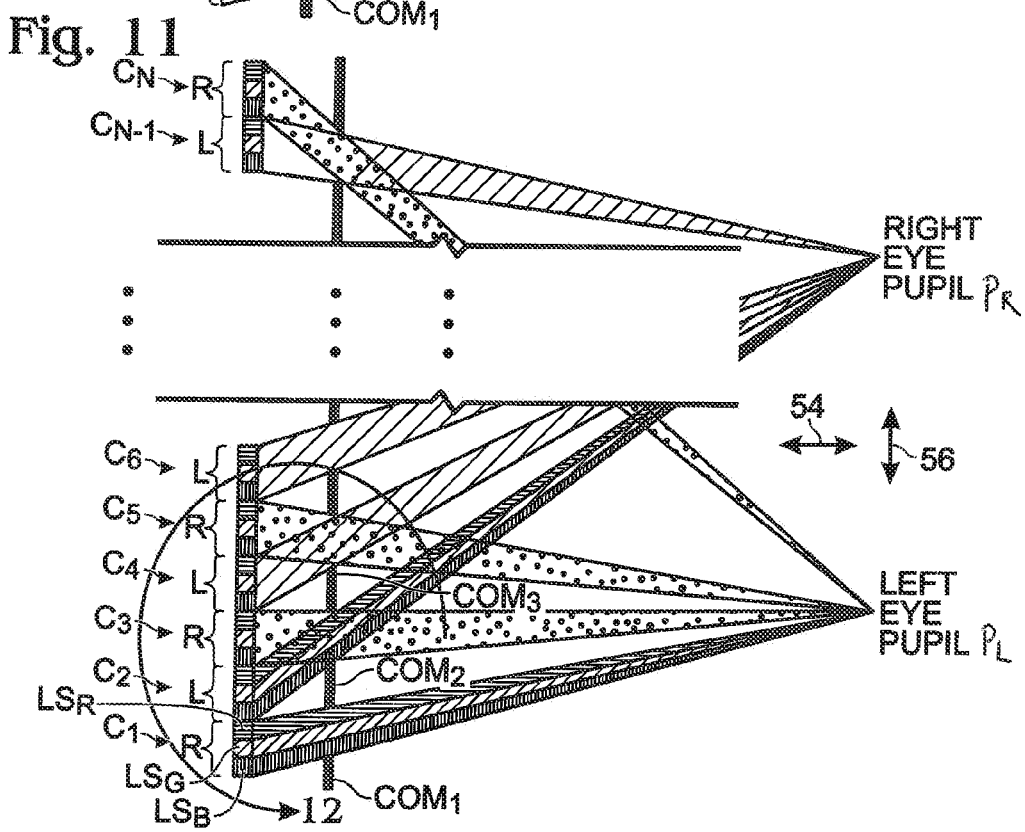

SYSTEM FOR DISTRIBUTING AUTO-STEREOSCOPIC IMAGES

CROSS REFERENCE TO OTHER APPLICATIONS

The application claims priority to U.S. Patent Application No. 61/712,208 which was filed on Oct. 10, 2012 and is a provisional application and as such is incorporated herein by reference in its entirety.

TECHNICAL FIELD

The embodiments of the present invention disclosed herein relate generally to the field of distributing auto-stereoscope images to remote viewers, and more particularly to distributing such images as digital video over the Internet.

BACKGROUND 3D image data are stereoscopic (or binocular), comprising pairs of stereoscopic images, each pair representing the same scene viewed from slightly different vantage points, to stimulate viewing the scene through two eyes. Each image of a stereoscopic pair of images therefore corresponds to a different one of the two eyes, and 3D image display technologies must ensure that each eye receives only the image corresponding to that eye with the other image being blocked or filtered out.

Three-dimensional ("3D") images, like two-dimensional ("2D") images, are viewed with an intended orientation relative to the viewer's eyes, in which from the user's perspective there is a "top" of the image, a "bottom" of the image, and "left" and "right" sides of the image. If the image is digital, it is defined by pixels arranged in a matrix that define rows running from left to right, and columns running from top to bottom (the columns run vertically, and the rows run horizontally, as the image is normally viewed).

Even if the image is not in digital form or has not been digitized, e.g., where it exists only on film, it can be specified as being defined by a finite number of pixels of a given size, where the image resolution is proportional to the number of pixels, and inversely proportional to the size of the pixels.

Most commonly, the two stereoscopic images are merged into a composite stereoscopic image in which the two stereoscopic images are distinctly coded, such as by color or light polarization, and interleaved with one another. Thus if each stereoscopic image has a resolution of X, the composite stereoscopic image will likewise have a resolution of X. Thus the pair of stereoscopic images taken together will have a resolution (or number of pixels) that is twice that of the resulting composite stereoscopic image; or looked at in reverse, the composite stereoscopic image will have only have the resolution of the pair of stereoscopic images taken together.

A pair of stereoscopic images corresponds to a single video frame, so they must be transmitted, for display in real-time, within the video frame rate, typically 1/60 second.

In the active shutter technology, the two stereoscopic images are transmitted sequentially; but again, for display in real-time, both must be transmitted within the video frame rate.

In general then, 2× pixels will need to be transmitted within the time defined by the video frame rate to enjoy full resolution of a 3D image, whereas only X pixels would have been required to enjoy the same resolution if the image were displayed in 2D. Since transmission bandwidth is normally a limiting factor in the transmission of video data, it is more practical, if the video is to be streamed or viewed in real-time, to transmit the composite stereoscopic image instead of the pair of stereoscopic images and sacrifice resolution.

A number of different 3D display technologies are currently in use. These technologies are typically used for displaying 3D video, but they can be used to display 3D still images as well.

Typically, the two stereoscopic images of a pair of stereoscopic images are distinctly coded such as by color or by light polarization, and the viewer must wear special glasses with distinctly different lenses for each eye, each lens having a filter suitable for passing only the image intended for that eye.

A different approach is known as "active shutter" display technology, which also requires special glasses. Here the two stereoscopic images are streamed in sequence, and the lenses of the glasses are independently controlled to either pass or block light from the display screen in appropriate synchronization.

Viewers generally prefer not to be required to wear special glasses to view 3D content, and to address this preference, there are a number of auto-stereoscopic display technologies that eliminate this requirement. These can be broadly categorized as being either "volumetric" technologies, such as holography, and "flat panel" technologies that display 3D from an essentially flat (from the viewer's perspective) display screen.

The flat panel auto-stereoscopic display technologies utilize two basic methods for distinguishing the two stereoscopic images of a stereoscopic image pair, namely, lenticular, and parallax blocking.

In the lenticular display technology, the panel is provided with a series of columnar lenses overlaying the columns of the display screen. Each lens preferentially directs the light emitted or reflected from the column (or columns) in particular directions within a limited range, so that the image defined by the column (or columns) is visible only if the eye is (or eyes are) within that range.

In the parallax blocking technology, the panel is provided with a mask defining a series of alternating and periodically spaced-apart stripes of opaque material, between which are defined corresponding light transmissive stripes. The stripes are aligned with the columns and overlay the display screen, but they are spaced some distance away, in front of the display screen, to generate parallax between the stripes of the mask and the columns of the display. Then, depending on the location of the viewer's eye, the parallax may be such as to either allow or prevent the viewer from being able to see one or more of the columns under the mask.

The lenticular technology is most often used for inexpensively displaying still images in 3D, or multiple 2D images (where different images are seen from respective different directions). In common usage, a molded lenticular screen is adhered on top of an image on a greeting card, or on packaging for consumer items, for example.

The parallax blocking technology is currently the technology of choice for displaying 3D video. It has been incorporated into 3D video cameras and televisions typically by use of patterned liquid crystal material, built-on to the display screen, which is turned on to define the opaque stripes when it is desired to view data in 3D, and turned off to allow the display to be used for viewing 2D images. This has cost and convenience drawbacks, which the present invention is directed to solving.

SUMMARY

Systems for distributing auto-stereoscopic images are disclosed herein. Among other things, the system provides for a method for providing a parallax blocking mask for attachment to the display device having a flat panel display screen and a particular configuration so as to enable auto-stereoscopic viewing with the display device. This method includes the steps of creating the mask at a first location, and sending the mask to a second location remote from the first location by common carrier, so that, when the mask is attached to the display device so as to overlie the display screen, an auto-stereoscopic image is produced by the mask.

The following additional features may be provided within the method for providing a parallax blocking mask, either separately or in combination: (1) providing the mask with alternating and periodically spaced-apart stripes of substantially opaque material and arranging the stripes to define a spatial duty cycle that is either substantially less than 50%, or more preferably within the range 20-40%, or most preferably, essentially ⅓, or as close to ⅓ as possible; and (2) where the display device displays an array of pixels and the pixels define columns, arranging the stripes so that they are periodically repeated at intervals equal to two of the columns.

The following feature may also be provided within the method for providing a parallax blocking mask, either alone or in combination with either or both of the features (1) and (2): (3) forming one or more composite stereoscopic images from a respective one or more stereoscopic image pairs, selecting, from within the image display device, data from each composite image obtained from just one of the associated stereoscopic image pairs, and displaying the data on the display screen with the mask mounted to the image display device.

The feature (3), in any combination within the method for providing a parallax blocking mask in which it is provided, may be combined with another feature (4) of storing the one or more composite images in the image display device.

The system also provides for a method for distributing 3D image content derived from one or more stereoscopic image pairs. This method includes forming respective compressed composite stereoscopic images from the one or more stereoscopic image pairs, storing the one or more compressed composite stereoscopic images on an Internet web server, downloading the one or more compressed composite stereoscopic images from the Internet web server to a remote image display device having a display screen, interleaving the one or more compressed composite stereoscopic images within the remote image display device, and displaying the interleaved one or more compressed composite stereoscopic images on the display screen.

The following additional features may be provided within the method for distributing 3D image content, either separately or in combination: (1) anamorphically compressing the one or more stereoscopic images; and (2) creating a parallax blocking mask having alternating and periodically space-apart stripes of substantially opaque material, each stripe having an equal width, wherein the display device defines an array of pixels arranged in columns, each column having an equal width, the step of creating including defining the width of the stripes based on the width of the columns, and sending the created mask to a remote location so that, when the mask is attached to the display device so as to overlie the display screen, an auto-stereoscopic image is produced by the mask.

The following feature may also be provided within the method for distributing 3D image content, either alone or in combination with either or both of the features (1) and (2): (3) providing a software application for performing said step of interleaving that is specially adapted for use in the remote image display device; and downloading the software application from the Internet web service to the remote image display device.

The feature (3), in any combination within the method for distributing 3D image content in which it is provided, may be combined with another feature (4) of producing multiple compressed composite stereoscopic images, wherein said step of downloading includes transmitting each compressed composite stereoscopic image over the Internet at a standard television frame rate.

The system also provides for a parallax blocking mask for an auto-stereoscopic image display device having a flat panel display screen, the blocking mask comprising alternating and periodically spaced-apart stripes of substantially opaque material defining a spatial duty cycle that is substantially less than 50%, or more preferably within the range 20-40%, or most preferably, essentially ⅓, or as close to ⅓ as possible.

The following additional features may be provided in the parallax blocking mask either separately or in combination: (1) the blocking stripes are permanently opaque; and (2) where the display device defines an array of pixels arranged in columns, the blocking stripes are periodically repeated at intervals equal to two of the columns.

The system also provides for an auto-stereoscopic display system, including a flat panel display, a parallax blocking mask attached to the flat panel display, the mask comprising a plurality of parallax blocking stripes defining a spatial duty cycle that is less than 50%, or more preferably within the ranged 20-40%, or most preferably, essentially ⅓, or as close to ⅓ as possible, and a signal processor disposed within the display system adapted to receive one or more pairs of stereoscopic images, interleave the images horizontally, and display the interleaved images so that when the blocking stripes of the mask are aligned with respective columns of pixels in the display, an auto-stereoscopic image is produced by the mask.

Preferably within the auto-stereoscopic display system, the spatial duty cycle of the blocking stripes is essentially one-third substantially opaque to two-thirds substantially transmissive.

The system also provides for a method for providing 3D television content over a communications channel. This method includes the steps of providing a server adapted to receive 3D image content and distribute that content over the communications channel to a selected subscriber as pairs of stereoscopic images, providing to the selected subscriber a parallax blocking mask adapted to overlay a flat panel display so as to produce auto-stereoscopic images in response to a display of interleaved pairs of stereoscopic images, and providing to the subscriber application software suitable for use by the display to receive the pairs of stereoscopic images and produce and display interleaved pairs of stereoscopic images.

The method for providing 3D television content over a communications channel may include providing a token to the subscriber for identifying the subscriber to the server to request receipt of 3D image content from the server, and providing administrative software within the server to receive a token sent over the communications channel, verify that the token qualifies the subscriber to receive 3D image content and, if so, send selected 3D image content to the subscriber.

It is to be understood that this summary is provided as a means for generally determining what follows in the drawings and detailed description, and is not intended to limit the scope of the invention. The foregoing and other objects, features, and advantages of the invention will be readily understood upon consideration of the following detailed description taken in conjunction with the accompanying drawings.

BRIEF DESCRIPTION OF THE DRAWINGS

FIG. 10 is a schematic diagram of a horizontal cross section of a monochromatic display device and a typical prior art parallax barrier mask showing columns of display pixels and viewer pupil positions to perceive stereoscopic images.

FIG. 11 is a schematic diagram of a horizontal cross section of a color display device and a typical prior art parallax barrier mask showing columns of red, green and blue display pixels and viewer pupil positions to perceive stereoscopic images.

DETAILED DESCRIPTION OF PREFERRED EMBODIMENTS

Content Provider and Service Provider

Figure 1:
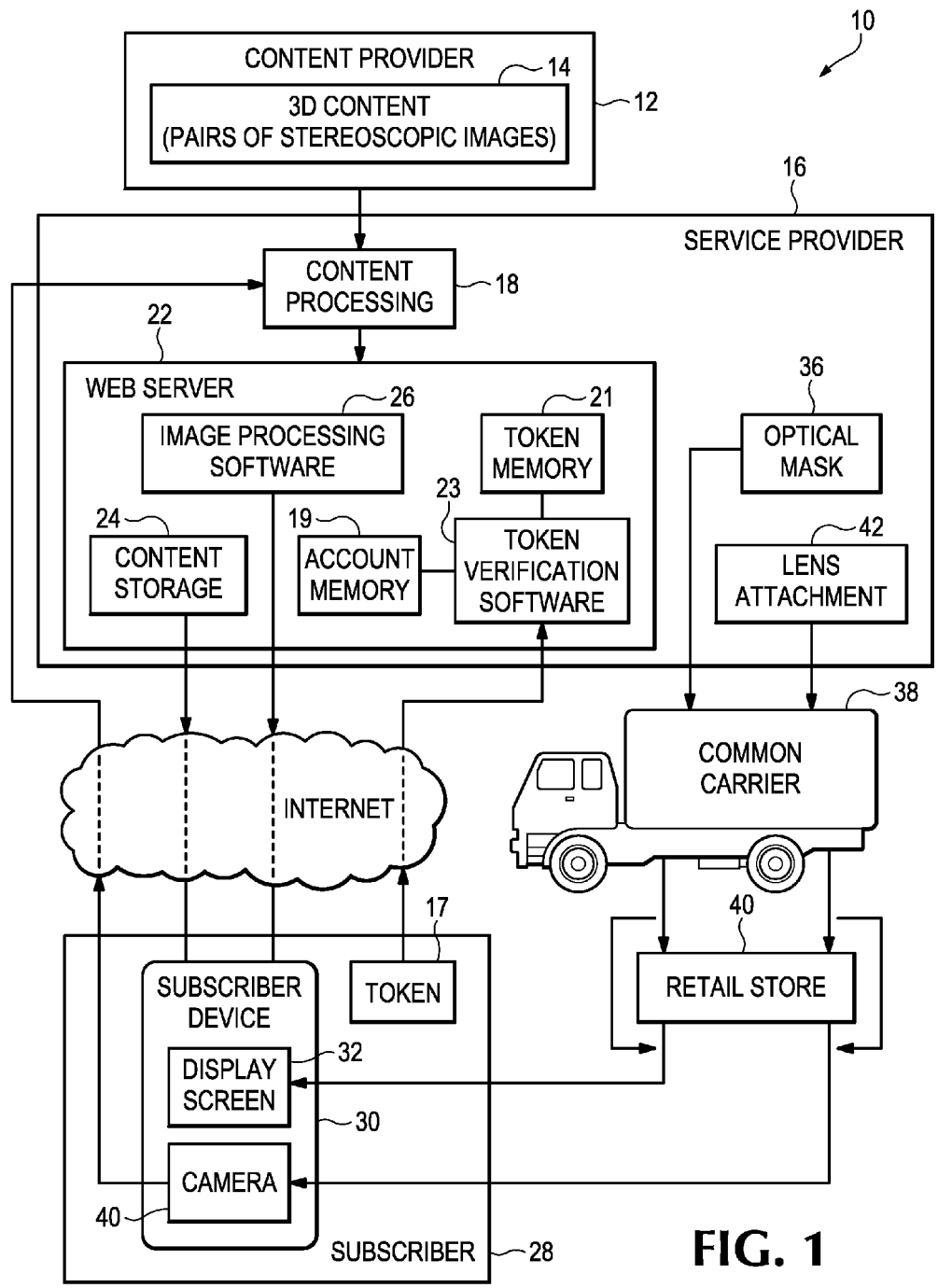
FIG. 1 is a block diagram of a preferred system for distributing auto-stereoscopic images according to the invention.

FIG. 1 shows a preferred system 10 for distributing auto-stereoscopic images, or "content", according to the present invention. The system includes a "content provider" 12 and a "service provider" 16. The content provider is a source of stereoscopic image pairs, referred to as "3D content" 14, which may be obtained in any known manner and provided in any known form.

The stereoscopic image pairs are typically a part of a video production, in which case there will be many of the stereoscopic image pairs associated together for sequential viewing, but they may represent stand-alone still images as well.

The 3D content 14 is provided by the content provider 12 to the service provider 16, preferably according to the terms of a pre-arranged agreement between the content provider and the service provider. The 3D content is typically in digital form, but this is not essential. The 3D content may be downloaded to the service provider over the Internet, but it could also be mailed in the form of hard media such as film or digital video disc (DVD). The format of the 3D content and the manner of its transmission or conveyance to the service provider 14 is not an important aspect of the invention.

Figure 2:
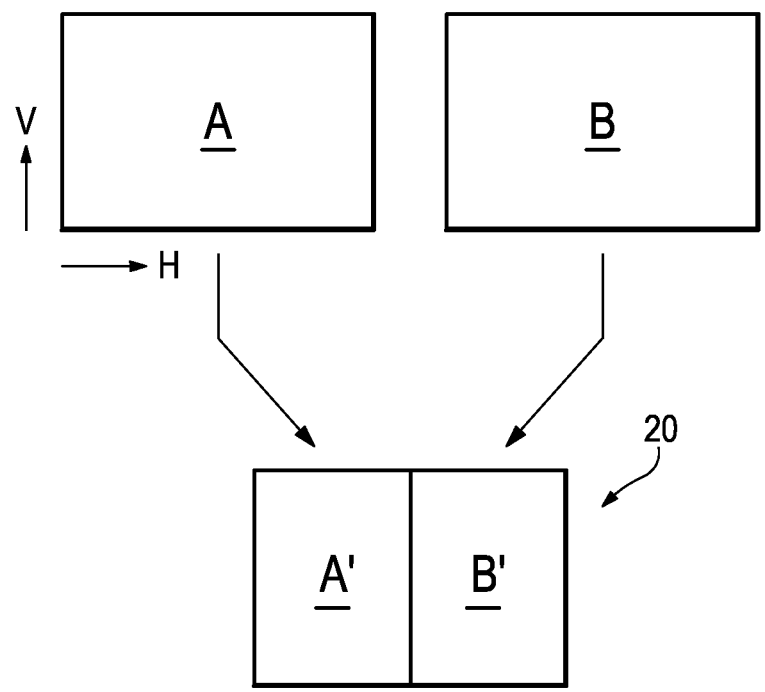
FIG. 2 is a schematic diagram of a process of combining the images of a pair of stereoscopic images to form a composite stereoscopic image.
Figure 3:
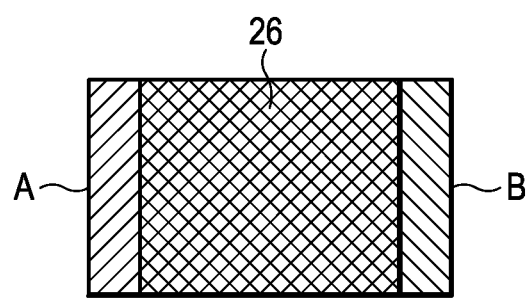
FIG. 3 is a schematic diagram of the overlapping field of the two stereoscopic images of a stereoscopic image pair.

With additional reference to FIG. 2, the service provide 14 includes a "content processing" module 18 that receives the 3D content 14 and, if not it is not in digital form already, digitizes it to produce digital stereoscopic image pairs A and B. It should be understood that each image of the pair represents the same scene at the same time seen from a different vantage point, where the vantage points of the two images A and B are within a limited distance from one another, typically 2.5" corresponding to the average separation of a viewer's eyes. Two camera lenses are utilized to view respectively the images A and B, with the fields of view of the two lenses overlapping. The result is illustrated graphically in FIG. 3, showing an overlapping area 26 in which the same objects are visible in both images A and B.

The content processing module 18 preferably further includes software for combining the stereoscopic image pairs A and B to form a corresponding composite stereoscopic image 20. FIG. 2 illustrates this result, in which the composite stereoscopic image 20 includes two halves A′ and B′, which are each horizontally, but not vertically (reference the axes "V" (vertical) and "H" (horizontal)), "compressed" versions of the images A and B, respectively. This is referred herein as an "anamorphic" compression, by which whole columns of pixels are eliminated from the A and B images, as will next be explained.

Figure 4:
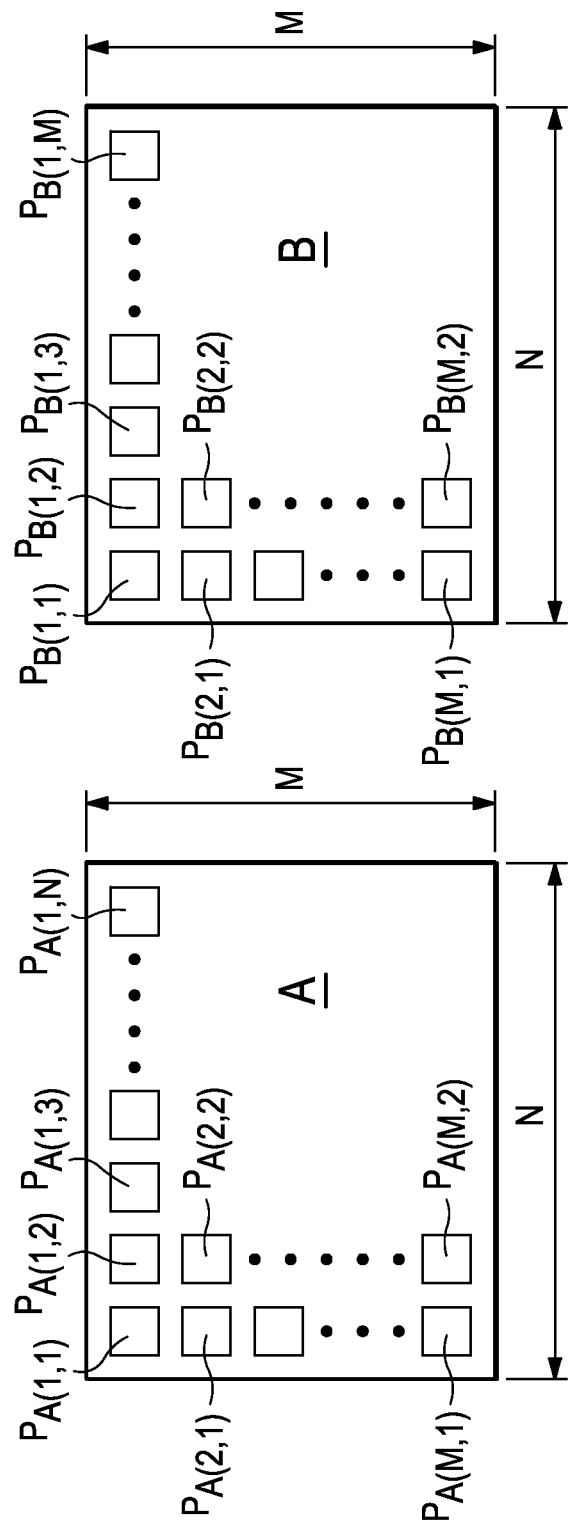
FIG. 4 is a schematic diagram of the two stereoscopic images of a stereoscopic pair as defined by corresponding arrays of pixels.

FIG. 4 shows the pixelated form of the pair of stereoscopic images A and B of FIG. 2. Image A is either actually or conceptually represented by pixels $P_{A(m,n)}$ where "m" is an integer ranging from 1 to "M", and "n" is an integer ranging from 1 to "N", and where M is the total number of rows and N is the total number of columns of the image A. Likewise, image B is either actually or conceptually represented by pixels $P_{B(m,n)}$. A few of these pixels are shown, it being understood that both images have M×N total pixels, arranged in M rows and N columns. FIG. 4 represents 3D content as it is received from the content provider 10.

Figure 5:
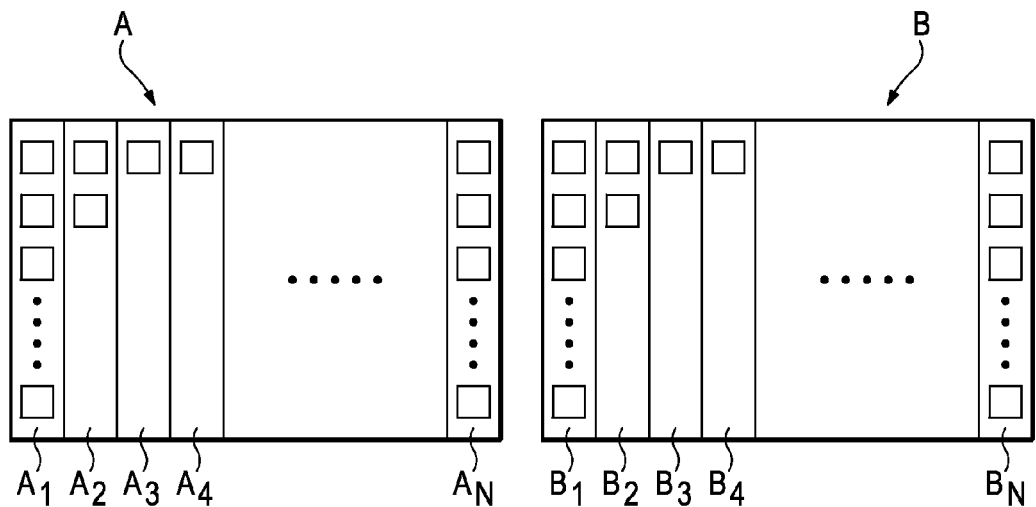
FIG. 5 is a schematic diagram corresponding to FIG. 4, showing columns defined by the two stereoscopic images.

FIG. 5 corresponds to FIG. 4, showing particularly the columns N in the images A and B, namely (from left to right) $A_1, A_2 \ldots A_N$; and $B_1, B_2, \ldots B_N$. So there are 2N total columns. It is desired to be able to transmit the 2N columns at the standard video frame rate, i.e., the frame rate at which, normally, only N columns are transmitted, corresponding to a single 2D image of resolution M×N.

Thus it is desired to eliminate half the data, and the anamorphic data reduction is preferably accomplished by eliminating alternating pairs of corresponding columns, e.g., eliminating columns $A_2, A_4, A_6$ etc. in the image A, to form the anamorphically compressed image of A′ of FIG. 2, and eliminating corresponding columns $B_2, B_4, B_6$, etc. in the image B, to form the anamorphically compressed image B′. However, other strategies for eliminating columns could be used without departing from the principles of the invention.

Figure 6:
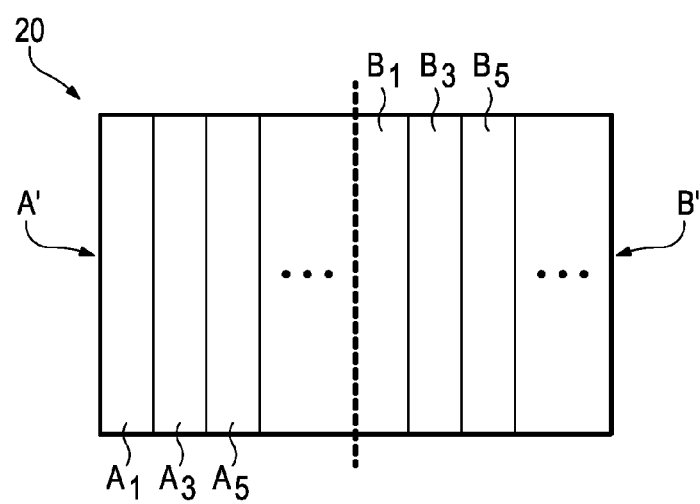
FIG. 6 is a schematic diagram corresponding to FIG. 5, showing a composite stereoscopic image according to the invention.

Turning to FIG. 6, the anamorphically compressed images A′ and B′ are concatenated to form an anamorphic composite stereoscopic image 20 that is ready for transmission. The width of the anamorphic composite stereoscopic image is W=N, since the width of each stereoscopic image of the original stereoscopic image pairs has been reduced in width from N to N/2 by the elimination of one-half of the original columns. Thus the anamorphic composite stereoscopic has a resolution M×N, the same as a single one of the stereoscopic images of a stereoscopic image pair.

Such compression is desired for video images so that the data contained in the images are reduced sufficiently to allow 3D content to be transmitted from the service provider over the Internet, to a subscriber 28, within the available bandwidth at the standard video frame rate. However, such processing may be omitted if the available bandwidth is large enough that it does not impose a limitation. Moreover, where image compression is desired, other compression strategies could be used, either lossy or lossless. Also, the video frame rate is not generally a limitation for still images, but still images are preferably anamorphically compressed in the same way as video data for consistency.

The anamorphic composite stereoscopic images 20 are stored by the service provider 16 in a "content storage" memory 24, which is shown in residing within a "web server" 22, but which need only be accessible by the web server 22. Alternatively, if it is not necessary to form compressed or composite images, the stereoscopic image pairs may themselves be stored in the memory 24. For purposes of discussion, it will be assumed that anamorphic composite stereoscopic images will be formed and stored in the memory 24.

Service Provider and Subscriber

The service provider 16 also interacts with a subscriber 28, preferably according to the terms of a pre-arranged agreement between the service provider and the subscriber. Particularly, the service provider provides the following services to the subscriber: (1) downloading, over the Internet, the anamorphic composite stereoscopic images to a "subscriber device" 30, which is typically a smart phone but which could be any camera, phone, computer or television having a flat panel display screen 32: (2) downloading or otherwise providing "image processing software" 26 to the subscriber device (3); and (3) providing an "optical mask" 36 to the subscriber.

The service (1) may be provided in any known commercial form, such as subscription TV, video on demand, and pay per view, and the images may be stored in a memory (not shown) of the subscriber's device for either controlled or uncontrolled periods of time.

Under the service (2), the image processing software is preferably downloaded over the Internet to the subscriber device 30 as a result of the subscriber communicating a "token" 17 to the web server 22, the token having been issued to the subscriber by the service provider 16.

However, the image processing software could also be provided as a physical object, such as a CD-ROM or flash drive, and delivered to the subscriber by the common carrier 38 (FIG. 1); and under either or both the services (2) and (3) a physical object may be delivered o any specified remote location by common carrier 38. The remote location could be anywhere the subscriber 28 specifies as a mailing address, or it could be a retail store at which the subscriber 28 may purchase or pick the object(s) up.

In connection with the service (2), the service provider 16 includes an account memory 19 for storing subscriber account information and a memory 21 for storing the issued tokens. The service provider 16 also includes a token verification software module 23 for comparing a token, received from the subscriber over the Internet, with the memory 21 to verify that the token is valid, and with the memory 19 for verifying that the subscriber's account is current.

In connection with the service (3), FIG. 1 shows the common carrier delivering the optical mask 36, either directly to the subscriber 28 or to a retail store 40 to which the subscriber 28 has access. It should be understood that the common carrier could deliver a hardcopy of the image processing software 26 to the same remote location.

Where the remote location at which a physical object is made available to the subscriber 28 under either service (2) and (3) is a retail store, preferably it is the same retail store that sells the subscriber devices.

Image Processing

The image processing software 26 that is made resident in the subscriber device 30, either by downloading or streaming it from the Internet or by other means, is an application that forms an interleaved composite stereoscopic image 34 from an anamorphic composite image 20, and fits the interleaved composite stereoscopic image 34 to the display screen 32.

Figure 7:
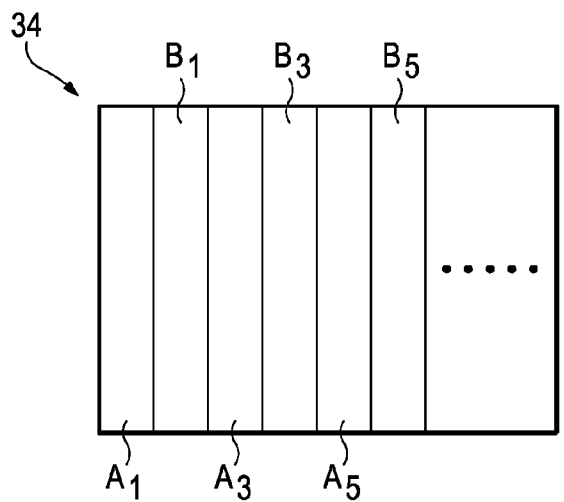
FIG. 7 is a schematic diagram of an interleaved composite stereoscopic image obtained from the composite stereoscopic image of FIG. 6.

FIG. 7 shows the resulting interleaved anamorphic composite image 34, obtained by interleaving the columns $A_1$, $A_3$, $A_5$, etc., of the left hand half A′ of the anamorphic composite image 20 of FIG. 6, with the corresponding columns $B_1$, $B_3$, $B_5$, etc., of the right hand half B′, on the assumption that the even numbered columns in both images have been eliminated in the anamorphic compression discussed above.

Preferably this interleaving is performed at the subscriber device 30 by the image processing software 26, but it could be instead be performed at the content processing module 18 at the service provider 16.

The interleaved composite stereoscopic images 34 are to be mapped to the display screen 32 of the subscriber device 30.

Figure 8:
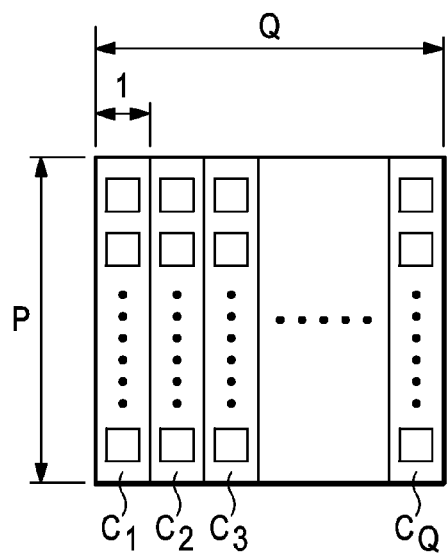
FIG. 8 is a schematic diagram of a display service showing pixels of the display device and corresponding columns.

FIG. 8 represents the display screen 32 of the subscriber device 30. It has "P" rows, and "Q" columns "C", of pixels, namely $C_1, C_2, \ldots C_Q$, defining a pixel space of size P×Q. Generally, P will be less than M (FIGS. 4 and 5); and Q will be less than N, so that there are more data in the interleaved composite stereoscopic image 34, in both the vertical and horizontal directions (see FIG. 4—axes "V" and "H"), than are needed to "fill" the pixel space P×Q. In that case, each column of the display screen 32 will be mapped to one column of the interleaved composite stereoscopic image 34, leaving behind columns at the left and/or right of the interleaved composite stereoscopic image, and leaving behind rows at the top and/or bottom of the interleaved composite stereoscopic image, as needed.

Referring back to FIG. 3, it should be noted that only the overlapping region of the images A and B provide 3D stereoscopic data. So the interleaved composite stereoscopic images 34 should be centered on the matrix P×Q, and the columns representing the extreme edges of the interleaved composite stereo images 34 would not be displayed. These unwanted columns may be discarded in the anamorphically compressed composite image 20 with the image processing software 18 at the service provider 16, and they may alternatively be discarded by the image processing software 26 at the subscriber device.

If there are not enough rows or columns in the interleaved composite stereoscopic image 34 to fill the pixel space P×Q, which could happen if either P>M or Q>N, the image processing software may insert a letterbox matte, or use any number of standard techniques to expand the images to fit the screen. However again, only the columns representing the overlapping region of the original images A and B should be displayed.

Optical Mask

Figure 9:
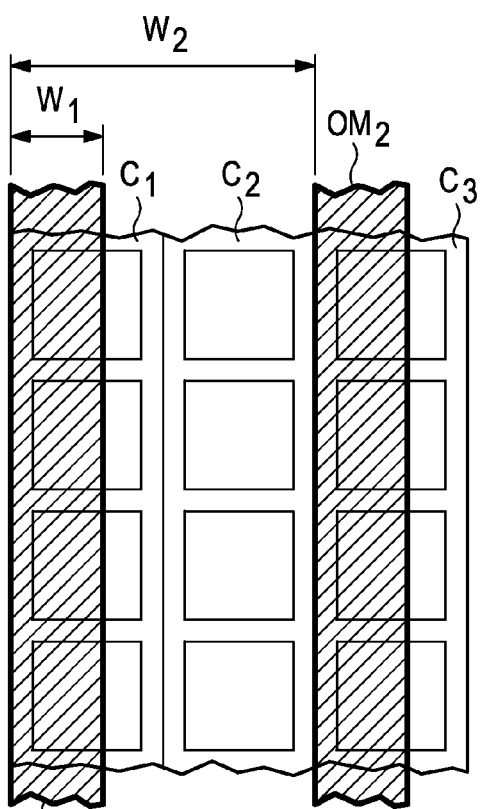
FIG. 9 is a schematic diagram of an enlarged portion of the display device of FIG. 8, in combination with an optical mask according to the present invention.

FIG. 9 shows, enlarged, a representative three of the columns C of the display screen 32 as shown in FIG. 9, namely, Columns $C_1$, $C_2$, and $C_3$. Registered to these three columns are a representative two optical mask elements "OM" namely $OM_1$ and $OM_2$, of a parallax blocking optical mask 36. The optical mask elements OM are periodically spaced opaque stripes. Corresponding light transmissive stripes are defined between the opaque optical mask elements OM.

The optical mask elements OM have equal widths $W_1$, whereas the spacing $W_2$ is the width of two adjacent pixel columns C. The spacing $W_2$ is obtained by dividing the width of the display screen 32 by the number of columns Q and multiplying by two.

The spacing $W_2$ between the optical mask elements OM is therefore determined by the column width (i.e., it is twice the column width) of the particular display screen 32; and the width $W_1$ also bears a relationship to the spacing $W_2$. As noted previously, in the prior art the opaque portions and the transmissive portions of a mask typically have the same width that is, the width of a single column of pixels on the display screen, and the mask is built in to the display screen.

The present inventor has recognized however, that the mask could be provided as an overlay tailor for the display screen 32, and such an optical mask together with image processing software also tailored to the subscriber device 30 can be provided for user installation on any subscriber device.

Thus there is no need for the image processing software 26 to have the flexibility to handle all the anticipated display screen variations such as was discussed above.

Instead, the service provider 16 can provide a specific version of image processing software that will work with the particular subscriber device.

Also as noted previously, the built-in prior art asks employ liquid crystals for the optical mask elements so that they can be turned on, for viewing 3D content, and off, for viewing ordinary 2D content. This requires additional manufacturing and operating expense as well as user involvement. However, the inventor herein has discovered that using an appropriate ratio of opaque stripe width to light transmissive stripe width, either 3D or 2D images may be viewed without alternating the mask.

Prior art stripes have typically been provided in a 1:1 width ratio, i.e., equal widths of opaque stripes alternating with light transmissive stripes, each width being the width of one column of display pixels. Then, 50% of the light from the display screen is blocked. So it is important to turn the mask off when it is desired to view 2D content.

But the present inventors have discovered that a 1:2 width ratio, with the opaque stripes having a width $W_1$ that is ½ the width of the light transmissive stripes, and more particularly where the width $W_1$ of the opaque stripes is ⅓ the width $W_2$ of two adjacent columns of display pixels, provides two outstanding advantages; first, it provides for significantly wider angle viewing, and second it reduces the light blockage so that it is feasible to leave a permanently striped mask on the display screen when viewing 2D content. The insight leading to this discovery was to recognized an advantage in "seeing around" the stripes, which is counterintuitive because the purpose of parallax blocking is essentially to prevent that.

Since the optical mask according to the invention is overlaid on an existing screen rather than being built into it, it is applied over a (typically) glass layer having thickness, and there are variations in the thickness of the glass with different devices. These variations may call for some adjustment of the 1:2 ratio.

It is convenient to recognize that the ratio of opaque stripe width to light transmissive stripe width in the case of a 1:2 width ratio is ⅓:⅔, and to define a spatial "duty cycle" or the opaque stripes of $W_1/W_2$, in this case ⅓ or 33%. Using this terminology, the spatial duty cycle is preferably less than 50%; more preferably within the range 20%-40%; and most preferably as close to ⅓ as possible.

Returning briefly to FIG. 1, the optical mask 36 is provided by the service provider 16 to the subscriber 28. Since the optical mask is a physical object, it is delivered by a common carrier, such as the US postal service or a private carrier, to the subscriber, or it may be delivered by the same type of carrier to a retail store for purchase or pick-up by the subscriber. The subscriber manually attaches the mask to the subscriber device 30 so that it overlies the display screen 32. The mask may be attached to the subscriber device in a number of different ways that will be apparent to persons of ordinary mechanical skill. Particularly if the display device 30 is a smart phone, the mask may be integrated with the standard screen protector and thereby be applied by snap fit to the outer contour of the phone, although other fastening means may be used.

It is important to minimize rotational misalignment between the optical mask 36 and the display screen 32, to eliminate the creation of Moire patterns, and this consideration calls for maintaining a close vertical alignment between these two components, but it has been found to be unimportant to maintain horizontal alignment, i.e., the mask elements OM in FIG. 10 may be shifted arbitrarily to the right or to the left without noticeably affecting their function.

An optical mask has been created by using a clear acetate sheet, of the sort used on overhead projectors, with a stripe pattern defining a 33% spatial duty cycle repeating over a width equal to two pixel columns being printed thereon by use of a standard Hewlett Packard LASERJET®. The mask was then used to overlay a liquid crystal device (LCD) display screen with outstanding results. In particular, the mask was found to provide for extreme wide angle viewing of 3D content.

Subscriber Generated Content

Also according to the invention, the subscriber 28 may upload 3D content captured at the subscriber device 30 to the service provider 16, and view the 3D content as it is being captured on the display screen 32.

Returning to FIG. 1, if as is typical the subscriber 30 has a camera 40, a standard stereoscopic lens attachment 42 is preferably provided to the subscriber 28 for the subscriber to install over the existing camera lens. Since the subscriber device already has a camera lens, the principle function of the lens attachment is to capture two stereoscopic images and couple them side-by-side to the entrance pupil of the camera lens.

The lens attachment 42, like the optical mask 26, may be either delivered to the subscriber 28 by common carrier, or made available for purchase at a retail store, preferably the same retail store that sells the subscriber devices. More preferably where the distribution channel is a retail store, the optical mask and the lens attachment are preferably bundled together, along with information defining a "token" or password for the user to use to request from the service provider 16 that the image processing software 26 be downloaded over the Internet to the subscriber device from the web server 22.

As an alternative, the software could also be provided as a physical object, such as a CD-ROM or flash drive, and bundled with the mask and lens attachment for distribution in a single package.

The stereoscopic lens attachment 42 may be used to cause the camera to acquire 3D stereoscopic images like the images A and B of FIG. 2. Such images can be uploaded to the service provider 16, over the Internet, in the same manner that like images have been downloaded to the service provider 16 from the content provider 12, routed to the content processing module 18. In such case, the images are processed to form anamorphically compressed composite stereoscopic images as described above, for downloading to the other subscribers.

The content could also, of course, be downloaded to the same subscriber who originally captured the images; however, the invention also provides for this subscriber to view the 3D content as it is being captured.

As noted above, the image processing software 26 is made resident in subscriber device 30, wherein it performs the functions of forming an interleaved composite stereoscopic image 34 from the anamorphic composite stereoscopic image 20 received from the service provider, and fitting the interleaved composite stereoscopic image 34 to the display screen 32.

For allowing the subscriber to view 3D content captured at the subscriber device 30, the image processing software 26 may provide, as an optional processing step, the same anamorphic composite stereoscopic image formation function that is ordinarily performed in the content processing module 18. The anamorphic stereoscopic lens would perform the anamorphic compression optically, eliminating the need for anamorphic compression to be accomplished in software.

Displaying 3D Content as 2D Content

According to the invention, 3D content may be displayed in 2D even with the optical mask 36 being present. The image processing software 26 may be adapted for this purpose to refrain from forming the interleaved composite stereoscopic image, and instead displaying just one half of the (preferably anamorphically compressed) composite stereoscopic image 20 as received from the service provider 16.

It has also been found that while the use of a parallax blocking mask having a duty cycle significantly less than fifty percent increases viewing angle and enables a single mask to be used for both 3D and 2D viewing, a further advantage can be achieved by using a blocking mask where the edges of the opaque stripes make a gray scale transition, particularly if the transition is dithered, and more particularly, stochastically dithered. This reduces the visibility, or contrast, of Moire patterns that are produced by optical interaction between different spatial frequency content of the mask and the display itself, especially when the mask is misaligned with the display. It also reduces the effects of color fringing in the case of a color display.

Turning to FIG. 10, which is a view from the top of a monochromatic display 50, a conventional mask 52 with nominally sharp edges is placed in front of the display 50, separated from the display by distance D in the axial dimension 54. The viewer is located in front of the mask with the viewer's left and right pupils located at positions $P_L$ and $P_R$ in the lateral (horizontal) dimension 56, respectively. It can be seen that, to achieve a three-dimensional effect, $C_1$ of the image is blocked by conventional opaque mask stripe $COM_2$ from being seen by the viewer's right eye at $P_R$, and $C_2$ of the image is blocked by opaque mask stripe $COM_2$ from being seen by the viewer's left eye at $P_L$. Thus, every odd numbered column of pixels, but none of the even numbered columns of pixels, can be seen by the viewer's left eye. Similarly, every even numbered column of pixels, but none of the odd numbered columns of pixels, can be seen by the viewer's right eye, and vice-versa. Where the odd numbered pixels display the left image of a stereoscopic pair of images and the even numbered pixels display the right image of the stereoscopic pair, the viewer at that position can perceive a three-dimensional image.

With this conventional mask properly aligned in the horizontal dimension with the display pixel columns, and the viewer located at the optimum axial and lateral location, the viewer should ordinarily see a three dimensional image without any interference effects. However, if the mask 52 is misaligned in the lateral, or the viewer is not at the optimum axial distance, the viewer will see some amount of a Moire interference pattern due to the different spatial frequency content of the mask compared to the display arising from the fact that the period of the mask is different than a multiple of the pixel period. The Moire interference fringes appear when the mask is not precisely manufactured and has a slightly different periodicity than the optimal design. The fringes increase in visibility with misalignment of the mask. They also appear and increase in visibility as the viewer moves away from the optimum viewing position.

FIG. 11 is similar to FIG. 10, but in this case each pixel has a red light source $LS_R$, such as a red-filtered liquid crystal retarder or a red light emitting diode, a green light source $LS_G$, and a blue light source $LS_B$, so that the display can produce colored images. The mask ensures that the colored light sources at each pixel can only be seen by one eye when the viewer is in the optimum viewing position.

Figure 12A:
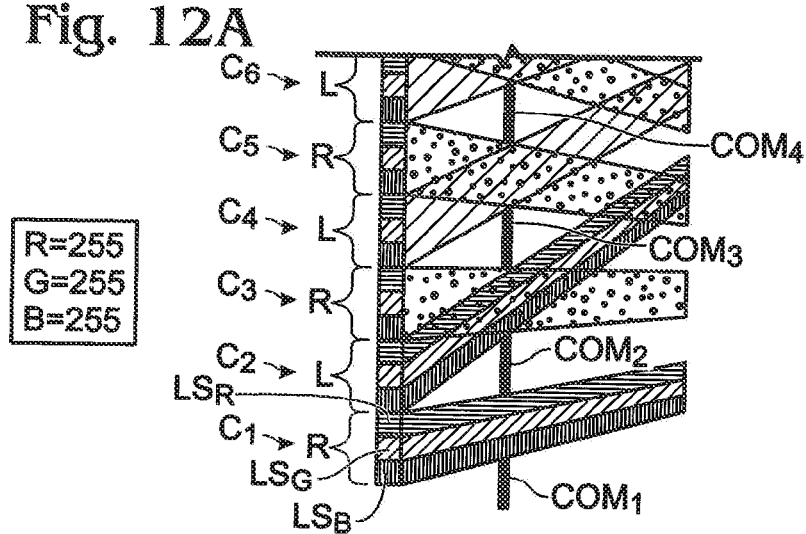
FIG. 12A is the schematic of FIG. 11 together with reference values of red, green and blue light intensity passing through transparent columns of the mask.

FIG. 12A is the same as FIG. 11, except that it shows that the intensity code for each color is 255. (This code has no intrinsic meaning; it is only used to illustrate relative intensities.) These intensities are the relative intensities of each color as perceived by the viewer, without regard to color mixing.

Figure 12B:
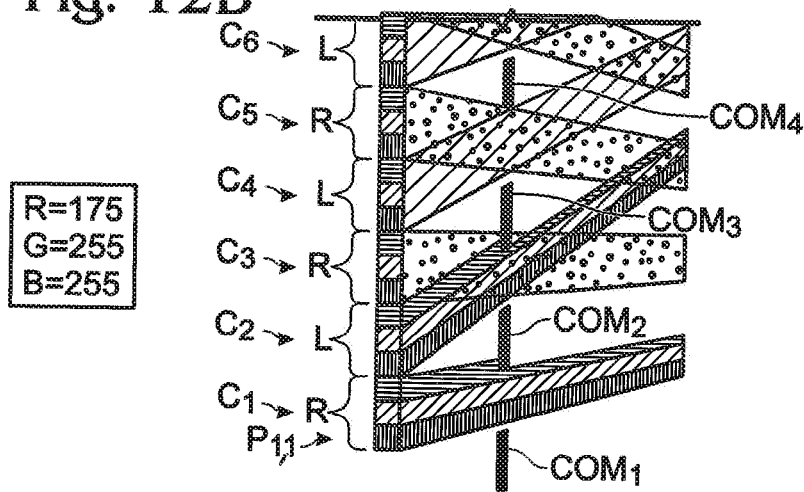
FIG. 12B is the schematic of FIG. 12A with the mask moved to the right.
Figure 13:
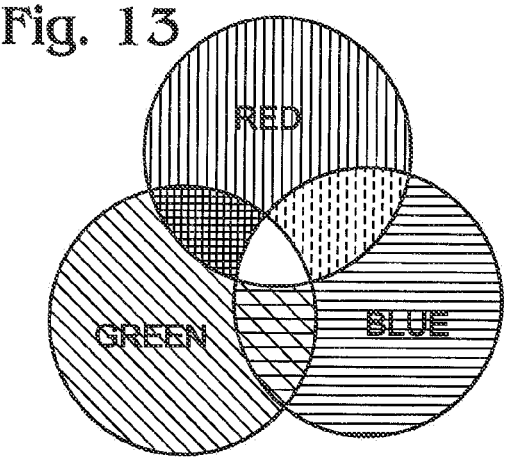
FIG. 13 is an illustration of how red, green and blue colors mix when they overlap.

However, in FIG. 12B, the mask has been moved slightly to the left in the lateral dimension. A consequence of this change is that a portion of the red light from pixel $P_{1,1}$ is blocked, which changes the intensity of red light from that pixel as seen by the viewer, thereby altering the perceived color, as illustrated by the color mixing chart of FIG. 13. In addition, this shift in mask position enables a portion of the blue light from other pixels to be seen by the viewer with both eyes, which produces undesirable color fringing.

Figure 12C:
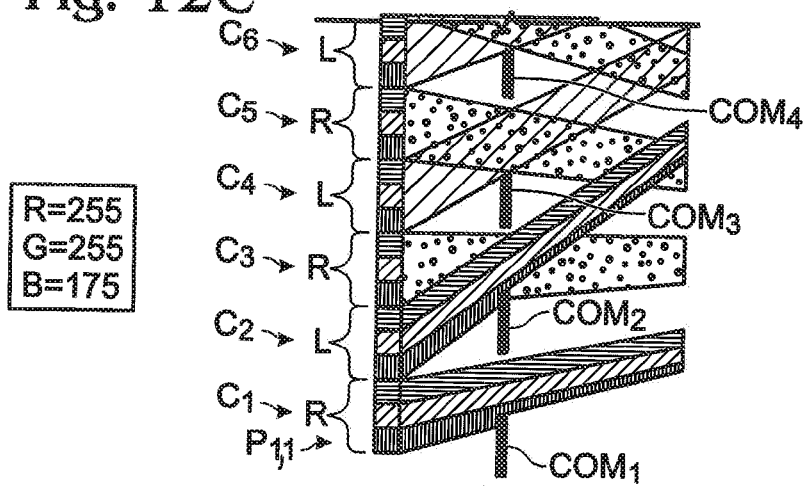
FIG. 12C is the schematic of FIG. 11 with the mask moved to the left.

Similarly, in FIG. 12C, the mask has been moved slightly to the the right. In this case a portion of the blue light from pixel $P_{1,1}$ is blocked, which changes the intensity of blue light from that pixel as seen by the viewer, thereby altering the perceived color, as illustrated by the color mixing chart of FIG. 13. In addition, this shift in mask position enables a portion of the red light from other pixels_to be seen by the viewer from both, which also produces undesirable color fringing.

Figure 14A:
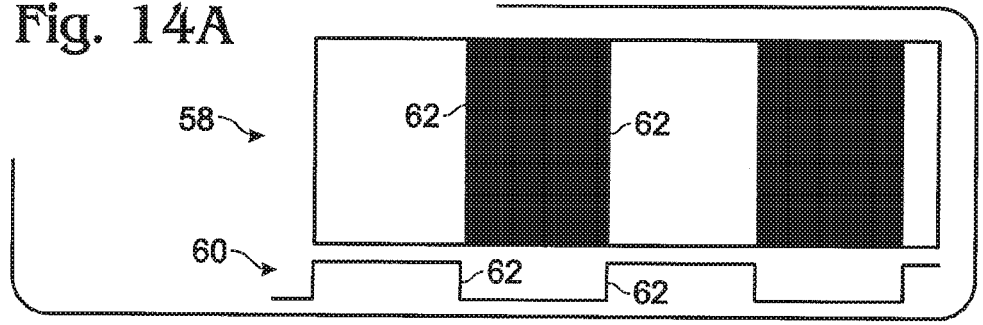
FIG. 14A shows front view and end view representations of the density of a section of a binary parallax barrier mask.

The front view 58 and lateral density profile 60 of a conventional mask with sharp edges 62 are illustrated in FIG. 14A. These sharp edges yield high contrast fringing effects discussed above. It can be shown that the spatial frequency content, visibility and color (in the case of a color display), depend on the duty cycle of the mask and the slope of the opaque stripe edges. In particular, the color, or tint, of the Moire pattern depends on the positions and slope of the edges. Changing the position of the edges will change the central color of the pattern; the slope will affect the distribution of colors within the fringes.

Figure 14B:
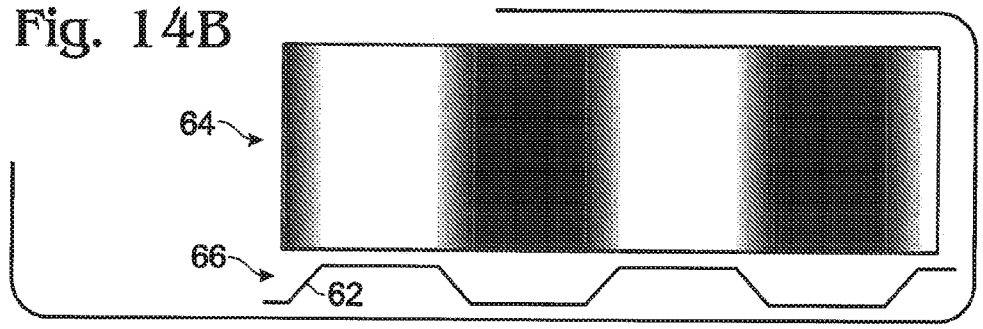
FIG. 14B shows front view and end view representations of the density of a section of a first sloped transition parallax barrier mask.
Figure 14C:
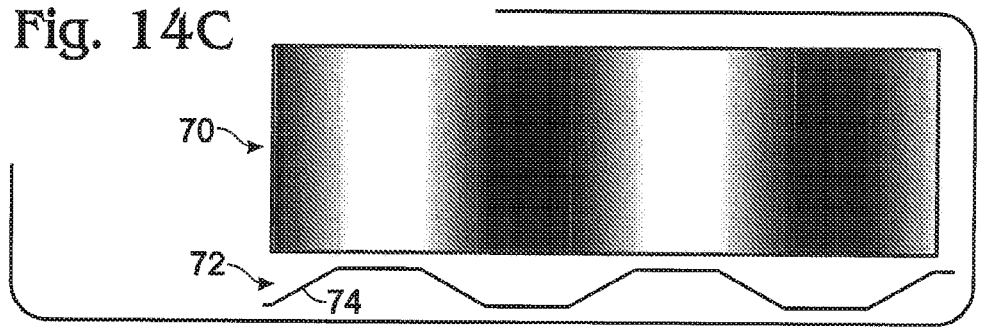
FIG. 14C shows front view and end view representations of the density of a section of a second sloped transition parallax barrier mask.

By adjusting these parameters, for example as shown in FIGS. 14B and 14C, these fringe characteristics can be controlled to some extent, but not completely. FIG. 14B shows a front view 64 and lateral density pattern 66 with a sloped density change 68, which produces a grey scale transition from opaque to transparent, and vice-versa. FIG. 14C shows a front view 70 and lateral density pattern 72 with a more gradually sloped density change 74, which produces a grey scale transition from transparent to opaque. Generally, the more gradual is the change in density, the lower the visibility of fringes produced by misalignment will be.

One preferred method of printing that can be adapted to for the purpose of producing a parallax blocking mask of the type disclosed herein is halftone printing, commonly used in the publishing industry to produce images for presentation to a viewer. Other methods that can be used are, for example, the xerographic transfer process, inkjet printing and the silver halide film process. In all of these printing methods, greyscale perception is achieved by the size, distribution and quantity of printed particles. A salient distinction here is that the methods are used to produce a blocking mask, rather than an image for presentation to a viewer.

Figure 15:
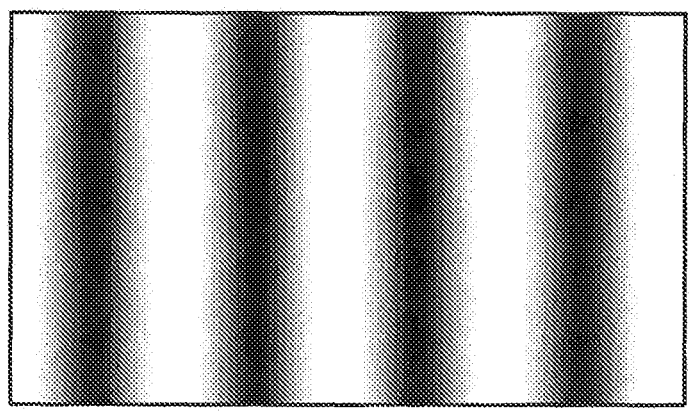
FIG. 15 is a front view of a grey scale density parallax barrier mask.

A front view of the density of a heuristically determined grey scale parallax blocking mask that was found to considerably reduce the production and visibility of Moire fringes in general and color fringing in the face of mask misalignment is shown in FIG. 15.

It has been discovered that, by printing the mask on a transparent medium using a binary printing method such that the perceived density of the printed pattern depends on the size, position and quanta of material deposited on the medium, the Moire patterns and color fringing can be significantly reduced. Specifically, by two-dimensional redistribution of such quanta of material so as to introduce spatial noise (dithering) while reducing their number or average randomized spacing so as to produce a gradual change from opaque to transparent at the edges of the stripes, the visibility of Moire fringes and color fringing in the face of mask misalignment, change in view position from the optimal position, or both, can be greatly reduced. This can be thought of as a mask with noisy transitions.

Figure 16:
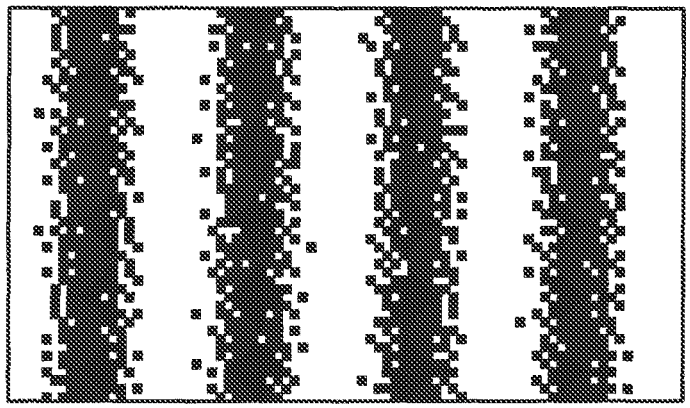
FIG. 16 is a front view of a barrier mask whose density accords with a diffusion dither transform of the grey scale density mask of FIG. 15.

Moreover, it has been discovered that fringing can be greatly reduced by using a mask that has been stochastically dithered. One known dithering method that is particularly effective is "diffusion dithering." An example of a parallax blocking mask produced by that method is shown in. FIG. 16. More specifically, the greyscale pattern of FIG. 15 was transformed to the mask pattern of FIG. 16 using a stochastic transformation algorithm known as the diffusion dither transform. A parallax blocking mask having this diffusion dithered greyscale pattern printed by binary printing process was found to greatly reduce the Moire and color fringing, sensitivity of the 3D image to mask misalignment, and sensitivity to user position.

It is to be understood that a mask having a duty cycle of less than fifty percent, as described herein, may be combined with the features of a mask having gradual edge transitions as also described herein to achieve optimal performance in a parallax blocking three dimensional display system as described herein.

The terms and expressions which have been employed in the foregoing specification are used therein as terms of description and not of limitation, and there is no intention, in the use of such terms and expressions, to exclude equivalents of the features shown and described or portions thereof, it being recognized that the scope of the invention is defined and limited only by the claims that follow.

The invention claimed is:

1. A method for enabling an image display device having a display screen to provide auto-stereoscopic viewing, comprising:
   acquiring a blocking mask having a plurality of alternating substantially opaque and substantially transparent stripes, said stripes having a longitudinal dimension in which they run and a lateral, orthogonal dimension in which they are separated, wherein there are gradual transitions in opacity between said substantially opaque and said substantially transparent stripes in which the local opacity varies significantly randomly in both the longitudinal and the lateral dimensions; and
   placing the blocking mask on the display screen of the display device so that when at least two interlaced stereoscopic images substantially aligned with the mask are displayed by the screen an auto-stereoscopic image is produced by the mask.

2. The method of claim 1, wherein the display device comprises an array of pixels arranged in pixel columns and said substantially opaque stripes of said blocking mask are arranged so as to correspond to at least every other column of predetermined pixel sets.

3. The method of claim 1, wherein said substantially opaque stripes of said blocking mask have a spatial duty cycle that is within the range 20-40%.

4. The method of claim 1, wherein said substantially opaque stripes of said blocking mask have a spatial duty cycle that is essentially ⅓.

5. The method of claim 1, further comprising causing the image display device to form one or more composite stereoscopic images from a respective one or more stereoscopic image pairs, selecting, from within the image display device, data from each composite image obtained from just one of the associated stereoscopic image pairs, and displaying the data on the display screen aligned with the blocking mask.

6. The method of claim 5, further comprising causing the image display device to store the one or more composite images in the image display device.

7. A method for enabling an image display device having a display screen and in the custody or under the control of another person to provide auto-stereoscopic viewing, comprising:
   providing to a person in custody or in control of the display device a blocking mask having a plurality of alternating substantially opaque and substantially transparent stripes, said stripes having a longitudinal dimension in which they run and a lateral, orthogonal dimension in which they are separated, wherein there are gradual transitions in opacity between said substantially opaque and said substantially transparent stripes in which the local opacity varies significantly randomly in both the longitudinal and the lateral dimensions;
   providing information to a person in custody or in control of the display device regarding placing the blocking mask on the display screen of the display device so that when at least two interlaced stereoscopic images substantially aligned with the mask are displayed by the screen an auto-stereoscopic image is produced by the mask; and
   providing to a person in custody or in control of the display device application software to be loaded in the display device suitable for use by the display to receive data representative of pairs of stereoscopic images pairs of the stereoscopic images suitable for causing an auto-stereoscopic image to be produced by the mask.

8. The method of claim 7, further comprising providing from a server over a communications network to a person in custody or control of the image display device data representative of pairs of stereoscopic images for producing auto-stereoscopic images.

9. The method of claim 8, further comprising providing a token to the person in custody or control of the display device for identifying the subscriber to the server to request receipt of stereoscopic image content from the server, and providing administrative software within the server to receive a token sent over the communications channel, verify that the token qualifies the subscriber to receive stereoscopic image content and, if so, send selected stereoscopic image content to the subscriber.

10. An auto-stereoscopic display system, comprising:
   an image display device having a display screen; a parallax blocking mask attached to the display screen, the blocking mask having a plurality of alternating substantially opaque and substantially transparent stripes, said stripes having a longitudinal dimension in which they run and a lateral, orthogonal dimension in which they are separated, wherein there are gradual transitions in opacity between said substantially opaque and said substantially transparent stripes in which the local opacity varies significantly randomly in both the longitudinal and the lateral dimensions; and
   a signal processor disposed within the display system adapted to receive one or more pairs of stereoscopic images, interlace the images horizontally, and display a thus-created interlaced image in substantial alignment with the mask so that an auto-stereoscopic image is produced by the mask.

11. The system of claim 10, wherein the display device comprises an array of pixels arranged in pixel columns and the substantially opaque stripes of the blocking mask are arranged so as to correspond to at least every other column of predetermined pixel sets.

12. The system of claim 10, wherein the substantially opaque stripes of the blocking mask have a spatial duty cycle that is within the range 20-40%.

13. The system of claim 10, wherein the substantially opaque stripes have a spatial duty cycle that is essentially as close to ⅓.

14. The system of claim 10, wherein the signal processor is adapted to form one or more composite stereoscopic images from a respective one or more stereoscopic image pairs, select from within the image display device data from each composite image obtained from just one of the associated stereoscopic image pairs, and display the data on the display screen aligned with the blocking mask.

15. The system of claim 14, wherein the signal processor is adapted to store the one or more composite images in the image display device.

16. The system of claim 10, wherein the display screen is a flat panel screen.

17. A parallax blocking mask adapted to cover a display screen of an image display device having an array of pixels for producing auto-stereoscopic images, the blocking mask comprising a sheet of material adapted to cover at least a portion of the display screen, the material having a plurality of alternating substantially opaque and substantially transparent stripes, said stripes having a longitudinal dimension in which they run and a lateral, orthogonal dimension in which they are separated, wherein there are gradual transitions in opacity between said substantially opaque and said substantially transparent stripes in which the local opacity varies significantly randomly in both the longitudinal and the lateral dimensions.

18. The parallax blocking mask of claim 17, wherein the predetermined alignment relationship with the pixels of the display screen includes at least that the substantially opaque stripes of the blocking mask are arranged so as to correspond to at least every other column of predetermined pixels sets.

19. The parallax blocking mask of claim 18, wherein the spatial frequency content of said alternating substantially opaque and substantially transparent stripes differs from the spatial frequency content of said pixel columns.

20. The parallax blocking mask of claim 17, wherein the substantially opaque stripes of the blocking mask have a spatial duty cycle that is within the range 20-40%.

21. The parallax blocking mask of claim 17, wherein the substantially opaque stripes have a spatial duty cycle that is essentially ⅓.

22. The parallax blocking mask of claim 17, wherein the mask is formed by printing opaque stripes and transitions on a transparent medium using xerography.

23. The parallax blocking mask of claim 17, wherein creating the alternating substantially opaque and substantially transparent stripes comprises producing a mathematical representation of an alternating pattern of substantially opaque stripes and substantially transparent stripes wherein the transitions in opacity are defined by a known function for gradually varying opacity, then transforming that transition to a dithered distribution of local opacity on a transparent background.

24. The parallax blocking mask of claim 17, wherein a desired greyscale pattern of alternating substantially opaque and substantially transparent stripes is transformed to a pattern to be printed using a known stochastic dithering function.

25. The parallax blocking mask of claim 24, wherein the known function is a diffusion dithering function.

26. The parallax blocking mask of claim 17, wherein creating the mask comprises printing said substantially opaque and substantially transparent stripes on a transparent material using a binary printing process whose minimum feature size is some fraction of the minimum feature size of the pattern.

27. The parallax blocking mask of claim 26, wherein the binary printing process is selected from one of a half tone printing process, a xerographic transfer process, inkjet printing and the silver halide film process.

28. The parallax blocking mask of claim 17, wherein the mask is adapted to cover a flat panel display screen.

29. A method for making a parallax blocking mask for an autostereoscopic display system having a display screen having an array of pixels for producing interlaced stereoscopic images, comprising:
provifying a sheet of material adapted to cover at least a portion of the display screen;
processing the sheet of material so as to create alternating substantially opaque and substantially transparent stripes, said stripes having a longitudinal dimension in which they run and a lateral, orthogonal dimension in which they are separated, wherein there are gradual transitions in opacity between said substantially opaque and said substantially transparent stripes in which the local opacity varies significantly randomly in both the longitudinal and the lateral dimensions.

30. The method of claim 29, wherein the stripes have a predetermined alignment relationship with columns of the pixels of the display screen so as to produce an autostereoscopic image when the screen displays interlaced stereoscopic images.

31. The method of claim 30, wherein the predetermined alignment relationship with the pixels of the display screen includes at least that the substantially opaque stripes of the blocking mask are arranged so as to correspond to at least every other column of predetermined pixels sets.

32. The method of claim 29, wherein the substantially opaque stripes of the blocking mask have a spatial duty cycle that is within the range 20-40%.

33. The method of claim 29, wherein the substantially opaque stripes have a spatial duty cycle that is essentially ⅓.

34. The method of claim 29, wherein the sheet of material is transparent and the blocking mask is produced by printing the opaque stripes and transitions on the sheet of material using a binary printing process selected from one of a half tone printing process, a xerographic transfer process, inkjet printing and the silver halide film process.

35. The method of claim 29, wherein the gradual change in opacity between adjacent substantially opaque and substantially transparent stripes is created using stochastic dithering of local opacity.

36. The method of claim 29, wherein creating alternating substantially opaque and substantially transparent stripes comprises producing a mathematical representation of an alternating pattern of substantially opaque stripes and substantially transparent stripes wherein the transitions in opacity are defined by a known function for gradually varying opacity, then transforming that transition to a dithered distribution of local opaque in a transparent background.

37. The method of claim 36, wherein the transformation to a dithered distribution of opaque regions employs a stochastic dithering transform.

38. The method of claim 37, wherein the stochastic dithering transform comprises a diffusion dither transform.

39. The method of claim 29, wherein making the mask comprises printing said substantially opaque and substantially transparent stripes on a transparent material using a binary printing process whose minimum feature size is some fraction of the minimum feature size of the pattern.

40. The method of claim 39, wherein the binary printing process is selected from one of a half tone printing process, a xerographic transfer process, inkjet printing and the silver halide film process.

41. The method of claim 29, wherein making the mask comprises printing the said alternating substantially opaque and substantially transparent stripes on a transparent material using a binary printing process that exhibits a naturally random distribution of printed particles whose grain size is large in comparison with one-half the period of the lowest spatial frequency of the mask.

42. An auto-stereoscopic display device, comprising:
a display medium for presenting one or more pairs of stereoscopic, horizontally interlaced images; and
a parallax blocking mask having a predetermined spatial relationship to the display medium, the blocking mask having a plurality of alternating substantially opaque and substantially transparent stripes, said stripes having a longitudinal dimension in which they run and a lateral, orthogonal dimension in which they are separated, wherein there are gradual transitions in opacity between said substantially opaque and the substantially transparent stripes in which the local opacity varies significantly randomly in both the longitudinal and the lateral dimensions, so that when the display medium is illuminated an auto-stereoscopic image is produced.

43. The system of claim 42, wherein the substantially opaque stripes of the blocking mask have a spatial duty cycle that is within the range 20-40%.

44. The system of claim 42, wherein the substantially opaque stripes have a spatial duty cycle that is essentially as close to ⅓.

45. The system of claim 42, wherein the display medium is substantially flat.

* * * * *